US010186256B2

United States Patent
Li et al.

(10) Patent No.: US 10,186,256 B2
(45) Date of Patent: Jan. 22, 2019

(54) METHOD AND APPARATUS FOR EXPLOITING LANGUAGE SKILL INFORMATION IN AUTOMATIC SPEECH RECOGNITION

(71) Applicant: Nuance Communications, Inc., Burlington, MA (US)

(72) Inventors: Weiying Li, Cupertino, CA (US); Daniel Willett, Walluf (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/109,321

(22) PCT Filed: Jan. 23, 2014

(86) PCT No.: PCT/US2014/012761
§ 371 (c)(1),
(2) Date: Jun. 30, 2016

(87) PCT Pub. No.: WO2015/112149
PCT Pub. Date: Jul. 30, 2015

(65) Prior Publication Data
US 2016/0329048 A1    Nov. 10, 2016

(51) Int. Cl.
*G10L 15/00* (2013.01)
*G10L 15/07* (2013.01)
(Continued)

(52) U.S. Cl.
CPC .............. *G10L 15/07* (2013.01); *G09B 19/04* (2013.01); *G09B 19/06* (2013.01); *G10L 15/005* (2013.01);
(Continued)

(58) Field of Classification Search
CPC ....... G10L 15/00; G10L 15/005; G10L 15/01; G10L 15/065; G10L 15/07; G10L 15/18;
(Continued)

(56) References Cited

U.S. PATENT DOCUMENTS

| 2004/0153306 A1* | 8/2004 | Tanner | G06F 17/273 |
| | | | 704/4 |
| 2007/0219776 A1* | 9/2007 | Gamon | G06F 17/27 |
| | | | 704/9 |

(Continued)

FOREIGN PATENT DOCUMENTS

| EP | 2 575 128 | 4/2013 |
| WO | WO 2015/112149 | 7/2015 |

OTHER PUBLICATIONS

International Preliminary Report on Patentability for PCT/US2014/012761 dated Aug. 4, 2016 entitled "Method and Apparatus for Exploiting Language Skill Information in Automatic Speech Recognition".

(Continued)

*Primary Examiner* — Qi Han
(74) *Attorney, Agent, or Firm* — Hamilton, Brook, Smith & Reynolds, P.C.

(57) ABSTRACT

Typical speech recognition systems usually use speaker-specific speech data to apply speaker adaptation to models and parameters associated with the speech recognition system. Given that speaker-specific speech data may not be available to the speech recognition system, information indicative of language skills is employed in adapting configurations of a speech recognition system. According to at least one example embodiment, a method and corresponding apparatus, for speech recognition comprise maintaining information indicative of language skills of users of the speech recognition system. A configuration of the speech recognition system for a user is determined based at least in (Continued)

part on corresponding information indicative of language skills of the user. Upon receiving speech data from the user, the configuration of the speech recognition system determined is employed in performing speech recognition.

20 Claims, 3 Drawing Sheets

(51) Int. Cl.
    *G09B 19/04*     (2006.01)
    *G09B 19/06*     (2006.01)
    *G10L 15/187*     (2013.01)
    *G10L 15/22*     (2006.01)

(52) U.S. Cl.
    CPC ............ *G10L 15/187* (2013.01); *G10L 15/22* (2013.01); *G10L 2015/227* (2013.01)

(58) Field of Classification Search
    CPC ......... G10L 15/20; G10L 15/24; G10L 15/32; G10L 15/34; G10L 2015/00; G10L 2015/06; G10L 2015/0635; G10L 2015/22; G10L 2015/225; G10L 2015/226; G10L 2015/227; G10L 2015/228
    USPC .................... 704/246, 250, 251, 244, 270, 8
    See application file for complete search history.

(56) References Cited

U.S. PATENT DOCUMENTS

| | | | |
|---|---|---|---|
| 2007/0294082 A1* | 12/2007 | Jouvet | G10L 15/005 704/231 |
| 2008/0228480 A1 | 9/2008 | Maegawa | |
| 2011/0313767 A1* | 12/2011 | Duffield | G10L 15/187 704/251 |
| 2012/0239399 A1 | 9/2012 | Yamazaki et al. | |
| 2012/0253799 A1 | 10/2012 | Bangalore | |
| 2013/0110511 A1 | 5/2013 | Spiegel et al. | |
| 2013/0238336 A1 | 9/2013 | Sung | |

OTHER PUBLICATIONS

International Search Report for PCT/US2014/012761 dated Aug. 4, 2014, entitled "Method and Apparatus for Exploiting Language Skill Information in Automatic Speech Recognition".

* cited by examiner

METHOD AND APPARATUS FOR EXPLOITING LANGUAGE SKILL INFORMATION IN AUTOMATIC SPEECH RECOGNITION

This application is the U.S. National Stage of International Application No. PCT/US2014/012761, filed on Jan. 23, 2014, published in English. The entire teachings of the above application are incorporated herein by reference.

BACKGROUND OF THE INVENTION

Speech recognition systems are typically trained with large speech data sets collected from a large number of speakers. Even when trained with a large training data set, speaker adaptation is still applied to the trained speech recognition system in order to enhance recognition performance for a particular user. Many approaches of speaker adaptation have been used in existing automatic speech recognition (ASR) systems. Existing speaker adaptation techniques usually make use of the speaker specific speech data collected by the ASR systems.

SUMMARY OF THE INVENTION

Speech recognition systems are usually trained with large data sets of speech data. Even after training, speaker-specific speech data is employed for speaker adaptation of a configuration of the speech recognition system. However, adequate speaker-specific speech data may not always be available to the speech recognition system. Also, performing speaker adaptation for each speaker is costly in terms of computational complexity and memory consumption. According to at least one example embodiment, information indicative of language skills of users is employed in adapting configurations of a speech recognition system.

According to at least one example embodiment, a method and corresponding apparatus for speech recognition comprise maintaining information indicative of language skills of users of the speech recognition system. A configuration of the speech recognition system for a user is determined based at least in part on corresponding information indicative of language skills of the user. Upon receiving speech data from the user, the configuration of the speech recognition system determined is employed in performing speech recognition.

The information indicative of language skills of the users may be acquired by the speech recognition system in different ways. For example, the speech recognition system or a corresponding application may query the users for the information indicative of corresponding language skills. The information indicative of language skills of the users may also, or alternatively, be inferred from personal data of the users. For instance, the speech recognition system, or the corresponding application, may periodically access personal data of the users and infer the information indicative of the corresponding language skills therefrom. The information indicative of language skills of the users may also, or alternatively, be inferred in response to updates made to the personal data of the users.

According to at least one example embodiment, in determining a configuration of the speech recognition system, one or more acoustic models are determined for the user. The configuration of the speech recognition system may also be achieved by restricting the languages supported by the speech recognition system to languages indicated in the information indicative of language skills of the user or allowing the speech recognition system to switch between languages indicated in the information indicative of language skills of the user. Determining the configuration of the speech recognition system may also include setting rules for pronunciation generation associated with the speech recognition system. The switching between languages may be triggered seamlessly based on automatic language identification among languages indicated in the information indicative of language skills of the user. The switching between languages may also be triggered manually by the user.

According to at least one example embodiment, the information indicative of language skills of the user includes languages spoken by the user and/or indications of degrees of proficiency in the languages spoken by the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Typical automatic speech recognition (ASR) systems are usually trained using a speech data set with speech samples from multiple speakers. Even when a large training data set is employed, speaker adaptation is still employed to achieve acceptable speech recognition performance by the ASR system. That is, acoustic models (AM) generated based on a training speech data set usually do not accurately represent voice characteristics of each user of the ASR system. Speaker adaptation usually involves acquiring and using speech data of a given speaker to adjust parameters of the ASR system, e.g., one or more acoustic models employed for the given speaker. Speaker adaptation is typically computationally costly and training speech data may not always be available for all users of the ASR system. Existing speaker adaptation technologies usually resolve part of the acoustic model mismatch problem, especially when available speaker-specific speech data, for users of the ASR system, is limited.

According to at least one example embodiment, information indicative of language skills of users of the ASR system is acquired and employed by the ASR system to improve corresponding speech recognition performance. In particular, language skills information for a user is employed to build one or more acoustic models for use in speech recognition for the same user.

Language skills of a speaker affect acoustic model characteristics of the same speaker. In particular, a user who is not a native speaker of a given language typically uses limited vocabulary when speaking the same language. Also, the speaker tends to have a slow speaking rate when speaking a language other than his native language. Furthermore, the speaker's native language usually affects the speaker's pronunciation of some phonemes, when speaking a non-native language, and consequently impacts the way the speaker pronounces some names and words. For example, the name "Jose" is pronounced differently by a Spanish native speaker than by an English native speaker. The pronunciation of the word "station" also differs between an English native speaker and a French native speaker. In addition, user's language skills define the range of languages uttered in speech applications by the user.

Figure 1:
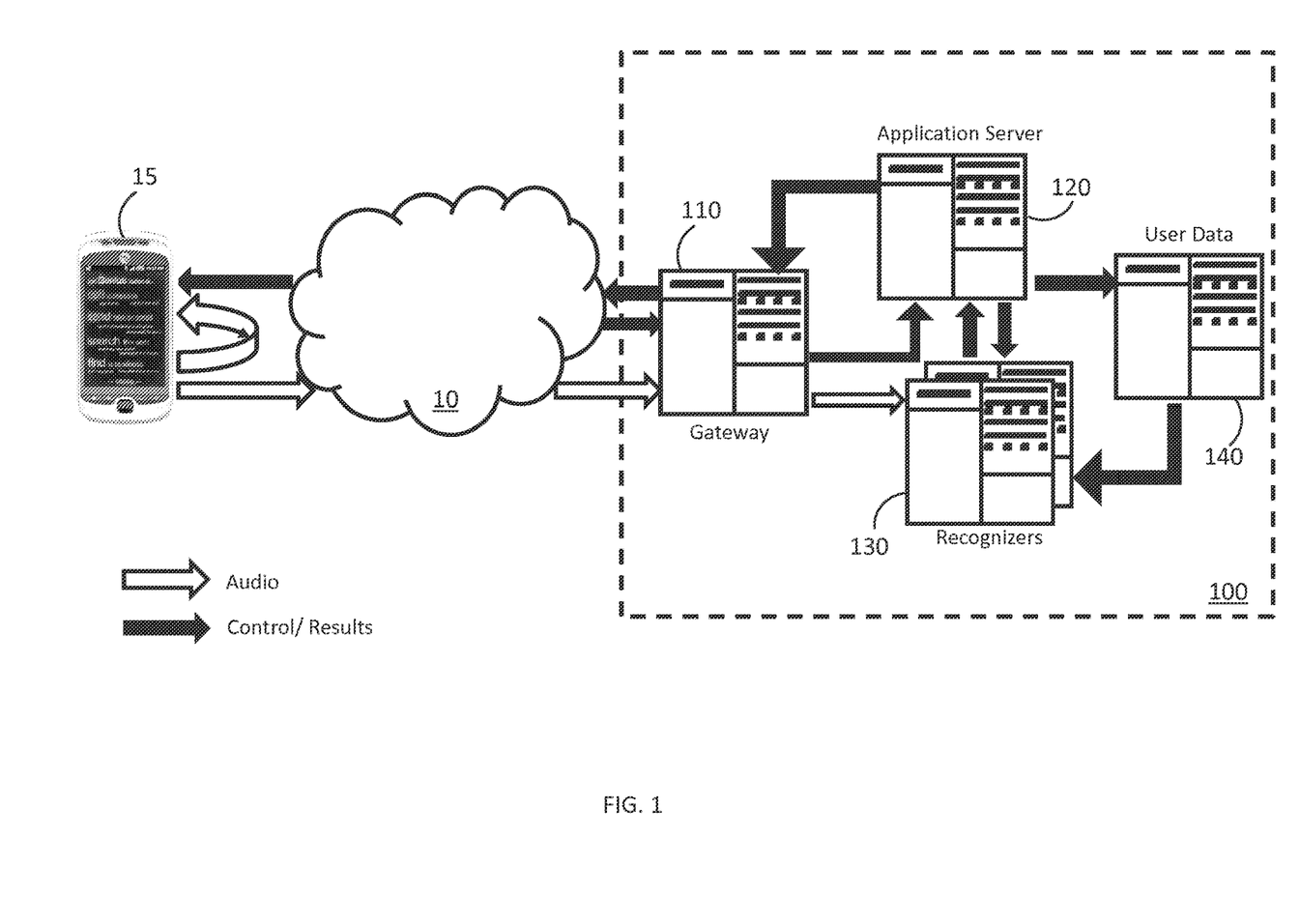
FIG. 1 is a diagram illustrating a system providing server-based automatic speech recognition, according to at least one example embodiment.

FIG. 1 is a diagram illustrating client-server architecture of an automatic speech recognition (ASR) system 100, according to at least one example embodiment. The ASR system 100 is coupled to a user device 15 through a communications network 10. The ASR system 100 includes a gateway 110, an application server 120, one or more speech recognizers 130, and a database 140 configured to store user data. The recognizers 130 are speech recognition modules configured to perform speech recognition on audio data received from user devices such as user device 15. The gateway 110 is configured to manage communications between the user device 15, the application server 120, and the recognizers 130. In particular, upon receiving a request from a client, the gateway 110 establishes a connection between the client and the application server 120 and passes the audio stream to an assigned recognizer for recognition. In performing speech recognition, the recognizers 130 are configured to make use of acoustic models, language model(s), and other information available to the ASR system 100.

The application server 120 is configured to manage and control applications employing speech recognition. In other words, the application server 120 is configured to use results provided by the recognizers 130 in order to get information requested by the user of the user device 15 and send the information the user. Information requested by the user includes, for example, a database query, web search, requested point of interest, navigation path, or the like. The database 140 is configured to store user data for use in speaker-dependent recognition. According to at least one example embodiment, the user data includes information indicative of the language skills of the corresponding user, e.g., the native language of the user, other languages spoken by the user, the level of fluency in each language by the user, and the like. The information indicative of the language skills of the user is employed in adjusting parameters, models, or characteristics associated with the ASR system 100 and improving speech recognition performance thereof.

Figure 2:
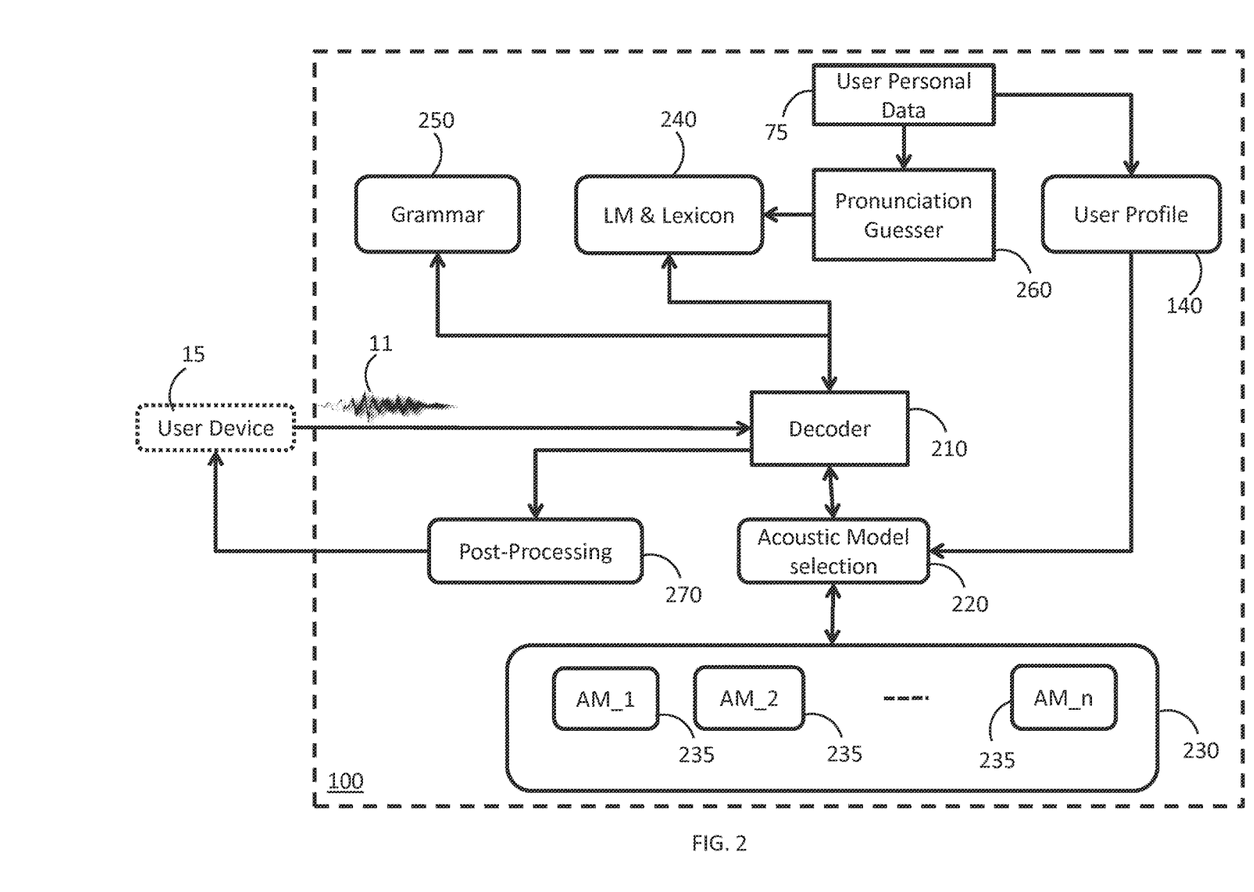
FIG. 2 is a block diagram illustrating modules of the ASR system, according to at least one example embodiment.

FIG. 2 is a block diagram illustrating modules of the ASR system 100, according to at least one example embodiment. The ASR system 100 includes a decoder module 210 configured to perform speech recognition on audio data 11, associated with a corresponding speaker, received from a corresponding user device 15. In decoding the audio data 11 into a corresponding meaning, the decoder module 210 interacts with other modules of the ASR system 100 and makes use of information thereof. Specifically, the decoder module 210 makes use of one or more acoustic models associated with the speaker of the audio data 11. An acoustic model selection module 220 is configured to select the one or more acoustic models from a plurality of acoustic models 235 stored in a database of acoustic models 230.

According to at least one example embodiment, the acoustic model selection module 220 is configured to select the one or more acoustic models, for use by the decoder module 210, based on user data from the database 140. In particular, the database 140 includes a user profile, for each user, with information indicative of ASR configuration specific to the same user. The ASR configuration includes language skills of the same user. The language skills in associated with a user profile may be set by the corresponding user upon request by the ASR system 100. Alternatively, information indicative of the language skills of the user may be automatically inferred from user personal data collected from one or more corresponding sources. The sources of the personal data include, for example, contacts, social media, voice messages, or other personal information applications associated with the same user. The sources of personal data may be residing in user devices 15 associated with the corresponding user or in the cloud, e.g., internet servers. User personal data collected for use by the ASR system 100 is stored in a database 75.

The user personal data may be periodically accessed, e.g., from the database 75 or sources of the user's personal data, and the information indicative of language skills of the user are accordingly inferred each time the personal data is accessed. Alternatively, inferring the information indicative of language skills of the user are triggered by updates of the user's personal data.

According to at least one example embodiment, a user profile is established in terms of language skills of the corresponding user. Information indicative of language skills, e.g., native language, other languages spoken, degree of proficiency in each spoken language, etc., of the user is obtained in several ways. For example, during user registration with the ASR system 100, the user is provided one or more questions regarding language skills of the user. Information obtained from the user is then employed in establishing the user's profile. Alternatively, information indicative of the language skills of the user may be obtained from user data, e.g., local settings, time zone, user interface (UI) language, speech UI language, available at one or more user devices 15 of the user. The ASR system 100 may also analyze personal data, such as electronic mail messages, voice mails, short message service (SMS) messages, names from contact list(s), location information, etc., associated with the user collected from user devices 15 or cloud devices, and deduce information indicative of language skills of the same user. The deduced information may be used together with, or instead of, other information provided by the user to establish the corresponding user profile. For instance, language skills of a user may be interpreted from location information associated with one or more mobile devices of the same user. For example, a Swiss user is likely to be fluent in at least French and German. Also, a Dutch or Scandinavian user is likely to be fluent in English besides a corresponding local language. According to an example implementation, such information may be employed to initially set a user profile, at least with respect to language skills, for a corresponding user.

In performing speech recognition on user data 11 associated with a given user, the decoder module 210 is further configured to interact with a language model and lexicon module 240 and a grammar module 250. The language model and the lexicon module 240 provides a catalogue of words and a statistical model reflecting probabilities of sequences of words within the same language. The grammar module 250 provides grammar rules associated with the same language. Upon decoding sounds associated with the audio data 11 into phonemes, the decoder unit 210 is configured to make use of the language model and lexicon module 240 and the grammar module 250 to reconstruct meaningful words, expressions, or sentences corresponding to the received audio data 11.

According to an example embodiment, the ASR system 100 employs information indicative of language skills of a given user to set pronunciation rules for the same user. For instance, based on the native language of the user, the ASR sets the rules for pronouncing one or more letters or sequences of letters. For example, the pronunciation of the sequence of letters "ing," differs from a native English speaker compared to a native Russian speaker user who is speaking English. Similarly, a speaker with French as the native language, when speaking English usually pronounces the sequence of letters "tion" differently than a native English speaker does. The pronunciation rules are set, or modified, within the ASR system 100 by setting, or changing, the rules for generating phonemes, for example, at a pronunciation guesser module 260 of the ASR system 100. Besides setting pronunciation rules, the pronunciation guesser module 260 also generates pronunciations for words not available at the LM and lexicon module 240 and adds them in the catalogue of words associated with the LM and lexicon module 240. For example, pronunciation of words retrieved from personal data of the user, e.g., names or words from a contact list, a calendar, social media, etc., and not available in the LM and lexicon module 240 are generated by the pronunciation guesser module 260 and provided to the LM and lexicon module 240 for use in speech recognition of audio data 11 by the same user.

Figure 3:
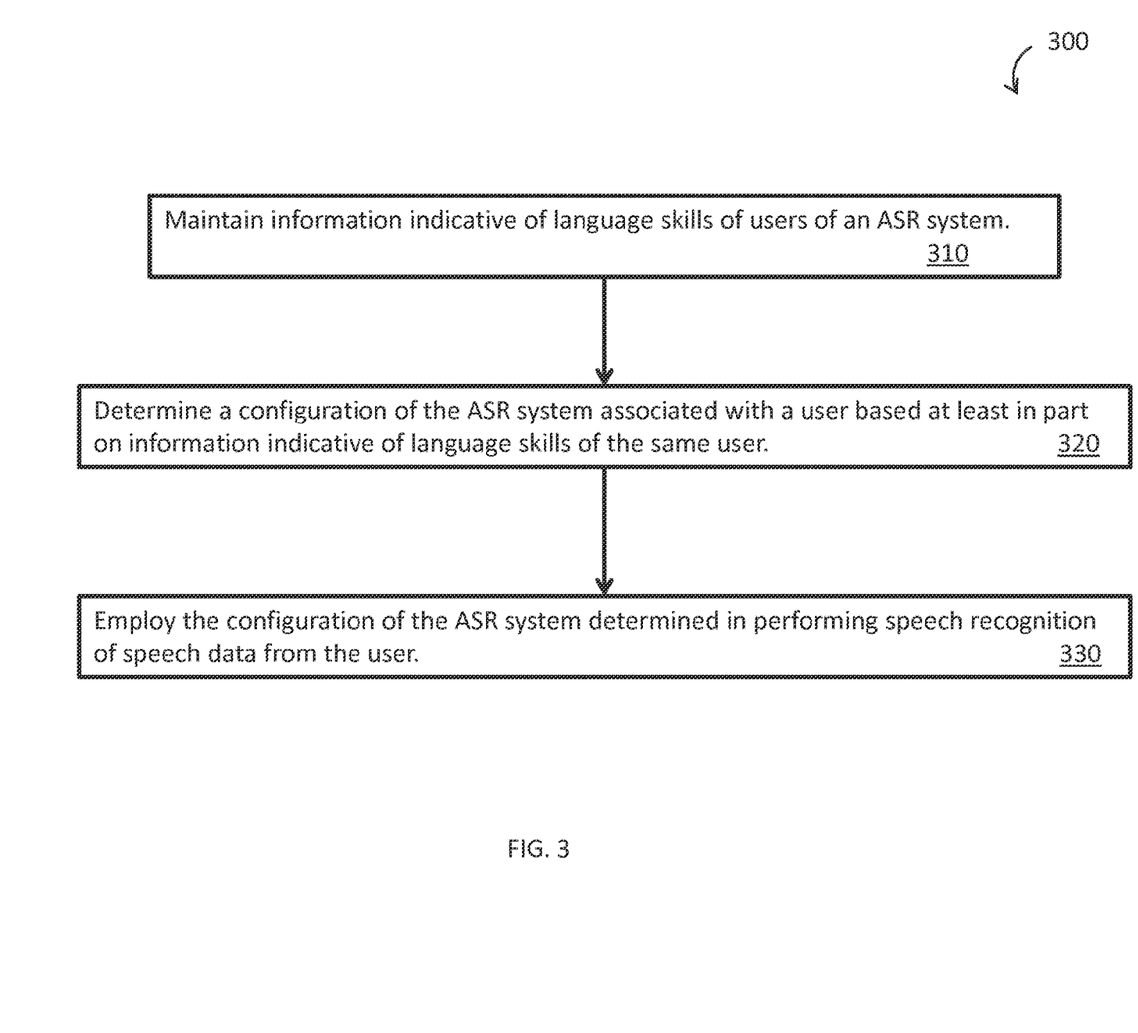
FIG. 3 is a flowchart illustrating a method of employing language skills of a speaker in performing speech recognition, by an ASR system, on audio data associated with the same speaker, according to at least one example embodiment.

FIG. 3 is a flowchart illustrating a method 300 of employing language skills of a user in performing speech recognition, by an ASR system 100, on audio data 11 associated with the same user, according to at least one example embodiment. At block 310, the ASR system maintains information indicative of language skills of the speaker. Such information includes, for example, the native language of the user, other languages spoken by the user, degree of proficiency by the user in each of the spoken languages, or the like. The information indicative of the language skills may be obtained from the user upon registration with the ASR system 100 or from automatically collected personal data of the user.

At block 320, a configuration of the speech recognition system associated with the same user is determined based at least in part on the information indicative of language skills of the user. Determining a configuration of the ASR system associated with the same user includes, for example, setting, or modifying, pronunciation rules for use in generating pronunciation of some words or names or in performing speech recognition of audio data 11 of the same user. Determining a configuration of the ASR system associated with the same user also, or alternatively, includes limiting languages related to one or more acoustic models associated with the user to languages spoken by the user. For example, if the ASR system 100 knows that a given user speaks Mandarin and English, the ASR system 100 just decodes corresponding audio data 11 assuming one of these two languages and does not mistaken an utterance from the user for word in Cantonese or German. That is, for multilingual users, the ASR system 100 makes use of acoustic models 235 and language models for multiple languages spoken by the same user in order to decode corresponding audio data 11. Also, a list of languages between which the ASR system may switch, when decoding audio data 11 from the user, is defined, for example, based on the spoken languages by the user and the corresponding degrees of proficiency.

Switching between different languages spoken by the user may be triggered seamlessly based on automatic identification of a language among the languages indicated in the information indicative of the language skills of the user. Alternatively, the switching between different languages may be manually triggered by the user, with the choice list of languages limited to or re-ordered towards the languages indicated in the information indicative of the language skills of the user.

For multilingual users, even if the corresponding spoken languages, e.g., English and Mandarin, are known, the final acoustic, or language, models used may be different between the multilingual users based on the corresponding proficiency levels with respect to at least one common spoken language. By further considering the levels of proficiency, more accurate acoustic, or language, models are determined and employed by the ASR system 100. For example, if a speaker A is fluent in English and fluent in Mandarin, while a speaker B is fluent in English but is a beginner in Mandarin, the acoustic, or language, models used for speaker A and B may be different.

Multiple users of the ASR system 100 usually share the same, or similar, language skills. According to at least one example embodiment, different groups are defined based on different language skill levels. One or more corresponding acoustic models, or language models, are then build, or defined, for each group. In other words, multiple users of the ASR system 100 usually share the same models if they have similar language skills. For example, for a given language, groups may be defined as native and very fluent speakers, non-native speakers with advanced level, and non-native speakers at a beginning level. For multilingual users, more than one language and corresponding proficiency levels may be used to define different groups. The acoustic models for each group may be built based on speech data from users of the same group. Alternatively, the acoustic models for each group is generated by adapting general speaker-independent (SI) models based on speech data collected from users of the same group, for example, during a deployment phase of the ASR system 100. One or more language models for each group may also be built, or generated, based on speech data from corresponding users in similar ways.

At block 330, the configuration of the speech recognition system determined is employed in performing speech recognition of speech data from the user. For example, upon receiving the speech data 11 and an indication of the identity of the corresponding user, for example, by the application server 120, the data base 140 is checked for the user profile of the user. The acoustic model selection module 220 then selects one or more acoustic models 235 for use by the decoder module 210 in performing speech recognition of the received audio data 11. Pronunciations of words or phrases generated by the pronunciation guesser module 260 and added to the catalogue of words associated with the LM and lexicon module 240 are also employed in performing speech recognition of the audio data 11.

One or more acoustic models associated with a given group are used, by the ASR system 100, for all users in the same group. By grouping users based on corresponding language skills, e.g., each group includes users sharing one or more language skills, and generating one or more common acoustic models for each group, at least one problem typically associated with providing speaker-specific acoustic models is overcome. Specifically, by using speech data from a group of users sharing similar language skills, instead from a single user, to generate one or more acoustic models overcomes the problem of the scarcity of user-specific speech data. Also, by generating one or more acoustic models for a group of users, instead of one or more acoustic models per speaker, the complexity of the ASR system in terms of computational complexity and memory usage is reduced.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of speech recognition comprising:
   employing, at a speech recognition system, a first model corresponding to a first language and first degree of proficiency of a user and a second model corresponding to a second language and second degree of proficiency of the user based on language skills included in a user profile of the user, the language skills indicating languages spoken by the user and, for each language spoken by the user, a degree of proficiency, the language skills further determined based on personal information of the user, wherein configuring the speech recognition system loads the first language, first degree of proficiency, second language, and second degree of proficiency from the user profile of the user; and
   performing speech recognition on speech data representing speech by the user's speaking in the first language using the first model, and responsive to the user's switching from speaking in the first language to the second language, automatically performing speech recognition using the second model.

2. The method as recited in claim 1, further comprising acquiring information indicative of the language skills by inferring the information from personal data of the users.

3. The method as recited in claim 2, wherein inferring the information from personal data of the users includes at least one of:
   periodically inferring the information from personal data of the users; and
   inferring the information in response to updates made to the personal data of the users.

4. The method as recited in claim 1, wherein employing the first model and second model of the speech recognition system further includes at least one of:
   determining one or more acoustic models for the user;
   restricting the languages supported by the speech recognition system to languages indicated in the information indicative of language skills of the user;
   allowing the speech recognition system to switch between languages indicated in the information indicative of language skills of the user; and
   setting rules for pronunciation generation associated with the speech recognition system.

5. The method as recited in claim 4, wherein switching between languages is triggered seamlessly based on automatic language identification among languages indicated in the information indicative of language skills of the user.

6. The method as recited in claim 4, wherein the switch between languages is triggered manually by the user.

7. The method as recited in claim 1, wherein the information indicative of language skills of the user includes languages spoken by the user.

8. The method as recited in claim 1, wherein the information indicative of language skills of the user includes an indication of a degree of proficiency in a language spoken by the user.

9. An apparatus for speech recognition comprising:
a processor; and
a memory, with computer code instructions stored thereon,
the processor and the memory, with the computer code instructions, being configured to cause the apparatus to:
employing, at a speech recognition system, a first model corresponding to a first language and first degree of proficiency of a user and a second model corresponding to a second language and second degree of proficiency of the user based on language skills included in a user profile of the user, the language skills indicating languages spoken by the user and, for each language spoken by the user, a degree of proficiency, the language skills further determined based on personal information of the user, wherein configuring the speech recognition system loads the first language, first degree of proficiency, second language, and second degree of proficiency from the user profile of the user; and
performing speech recognition on speech data representing speech by the user's speaking in a first language using a first model of the plurality of models, the first model being configured to recognize speech of the first language, and responsive to the user's switching from speaking in the first language to speaking in a second language, automatically performing speech recognition using a second model of the plurality of models, the second model being configured to recognize speech of the second language.

10. The apparatus as recited in claim 9, wherein the instructions are further configured to cause the apparatus to acquire the information indicative of language skills by inferring the information from personal data of the users.

11. The apparatus as recited in claim 10, wherein inferring the information from personal data of the users, the processor and the memory, with the computer code instructions, are further configured to cause the apparatus to:
periodically infer the information from the personal data; or
infer the information in response to updates made to the personal data of the users.

12. The apparatus as recited in claim 9, wherein employing the first and second model of the speech recognition system, the processor and the memory, with the computer code instructions, are further configured to cause the apparatus to:
determine one or more acoustic models for the user;
restrict languages supported by the speech recognition system to languages indicated in the information indicative of language skills of the user;
switch between languages indicated in the information indicative of language skills of the user; or
set rules for pronunciation generation associated with the speech recognition system.

13. The apparatus as recited in claim 12, wherein switching between languages, the processor and the memory, with the computer code instructions, are further configured to cause the apparatus to switch between languages upon automatic language identification among languages indicated in the information indicative of language skills of the user.

14. The apparatus as recited in claim 12, wherein switching between languages, the processor and the memory, with the computer code instructions, are further configured to cause the apparatus to switch between languages upon manual trigger by the user.

15. The apparatus as recited in claim 9, wherein the information indicative of language skills of the user includes languages spoken by the user or an indication of a degree of proficiency in a language spoken by the user.

16. A non-transitory computer readable medium having computer software instructions for speech recognition stored thereon, the computer software instructions when executed by a processor cause an apparatus to:
employing, at a speech recognition system, a first model corresponding to a first language and first degree of proficiency of a user and a second model corresponding to a second language and second degree of proficiency of the user based on language skills included in a user profile of the user, the language skills indicating languages spoken by the user and, for each language spoken by the user, a degree of proficiency, the language skills further determined based on personal information of the user, wherein configuring the speech recognition system loads the first language, first degree of proficiency, second language, and second degree of proficiency from the user profile of the user; and
performing speech recognition on speech data representing speech by the user's speaking in a first language using a first model of the plurality of models, the first model being configured to recognize speech of the first language, and responsive to the user's switching from speaking in the first language to speaking in a second language, automatically performing speech recognition using a second model of the plurality of models, the second model being configured to recognize speech of the second language;
wherein the automatic switching of languages is informed by a list of languages of the user profile of the user.

17. The non-transitory computer readable medium of claim 16, further comprising acquiring information indicative of language skills of the users by inferring the information from personal data of the users.

18. The non-transitory computer readable medium of claim 17, wherein inferring the information from personal data of the users includes at least one of:
periodically inferring the information from personal data of the users; and
inferring the information in response to updates made to the personal data of the users.

19. The non-transitory computer readable medium of claim 16, wherein employing the first and second model of the speech recognition system further includes at least one of:
determining one or more acoustic models for the user;
restricting the languages supported by the speech recognition system to languages indicated in the information indicative of language skills of the user;
allowing the speech recognition system to switch between languages indicated in the information indicative of language skills of the user; and
setting rules for pronunciation generation associated with the speech recognition system.

20. The non-transitory computer readable medium of claim 19, wherein switching between languages is triggered seamlessly based on automatic language identification among languages indicated in the information indicative of language skills of the user.

* * * * *